United States Patent
Nykter et al.

(10) Patent No.: US 8,261,160 B1
(45) Date of Patent: Sep. 4, 2012

(54) SYNCHRONIZATION OF SERIAL DATA SIGNALS

(75) Inventors: Sami Nykter, Espoo (FI); Vesa Lauri, Tuusula (FI); Carlo Moroni, Vimercate (IT)

(73) Assignee: Lattice Semiconductor Corporation, Hillsboro, OR (US)

( * ) Notice: Subject to any disclaimer, the term of this patent is extended or adjusted under 35 U.S.C. 154(b) by 1070 days.

(21) Appl. No.: 12/182,940

(22) Filed: Jul. 30, 2008

(51) Int. Cl.
*G06F 11/00* (2006.01)

(52) U.S. Cl. ........... 714/775; 714/725; 326/39; 341/100
(58) Field of Classification Search .................. None
See application file for complete search history.

(56) References Cited

U.S. PATENT DOCUMENTS

| 6,271,777 B1 * | 8/2001 | Lentine et al. ............... 341/100 |
| 6,529,148 B1 * | 3/2003 | Maddux .......................... 341/100 |
| 7,298,299 B1 | 11/2007 | Cheung et al. |
| 7,568,137 B1 * | 7/2009 | Kellermann ................. 714/725 |
| 2003/0115542 A1 * | 6/2003 | Hwang et al. ................. 714/798 |
| 2004/0268190 A1 * | 12/2004 | Kossel et al. ................. 714/704 |
| 2006/0107183 A1 * | 5/2006 | Ejima et al. ................... 714/758 |
| 2006/0120496 A1 * | 6/2006 | Okamura ...................... 375/355 |
| 2006/0227917 A1 * | 10/2006 | Buchwald et al. ............ 375/355 |
| 2007/0002990 A1 * | 1/2007 | Lee et al. ...................... 375/355 |
| 2008/0130810 A1 * | 6/2008 | Bae ............................... 375/355 |
| 2009/0323875 A1 * | 12/2009 | Kossel .......................... 375/354 |

* cited by examiner

*Primary Examiner* — Christopher McCarthy
(74) *Attorney, Agent, or Firm* — Haynes and Boone, LLP

(57) ABSTRACT

Various techniques are provided for synchronizing serial data signals received by electronic systems or devices such as programmable logic devices (PLDs). In one example, a method of synchronizing data includes receiving a serial data signal at a device. The serial data signal operates independently of the device. The method also includes oversampling the serial data signal to provide a plurality of samples distributed over bit periods of the serial data signal. The method further includes filtering the samples to correct errors in the samples. In addition, the method includes extracting a plurality of data bit values from the samples under the control of a clock signal associated with the device without adjusting a frequency of the clock signal. Each data bit value is associated with one of the bit periods of the serial data signal.

16 Claims, 10 Drawing Sheets

SYNCHRONIZATION OF SERIAL DATA SIGNALS

TECHNICAL FIELD

The present invention relates generally to data synchronization and, more particularly, to the synchronization of serial data signals received by electronic systems or devices such as programmable logic devices (PLDs).

BACKGROUND

In various types of electronic devices, synchronous serial data signals may be provided without a separate clock signal. In such implementations, a device receiving a serial data signal may be required to perform synchronization using only the serial data signal without the aid of a separate dedicated clock signal.

For example, in one approach (e.g., in conventional analog serializer/deserializer (SERDES) applications), a receiving device may adjust the speed of its local clock to properly synchronize with a serial data signal. However, such an approach may be impractical to implement in certain types of devices such as programmable logic devices (PLDs) including field programmable gate arrays (FPGAs) or complex programmable logic devices (CPLDs).

For PLDs, an alternate approach may be used in which data provided by the serial data signal is synchronized with an existing stable local clock of a PLD. For example, a serial data signal received by one input (e.g., a low-voltage differential signaling input) of a PLD may be oversampled (e.g., four times oversampled) by the FPGA, and the data encoded in the serial data signal may be extracted from the samples. Unfortunately, this approach can be problematic when high speed serial data signals are received. For example, at serial data speeds in excess of approximately 200 Mbps, system skew and jitter may exceed approximately ¼ of a clock cycle, thus making it extremely difficult to extract the data from the serial data signal.

Accordingly, there is a need for an improved approach to the synchronization of serial data signals. In particular, there is a need for such an approach that addresses the concerns associated with the synchronization of such serial data signals with PLDs.

SUMMARY

In accordance with one embodiment of the present invention, a method of synchronizing data includes receiving a serial data signal at a device, wherein the serial data signal operates independently of the device; oversampling the serial data signal to provide a plurality of samples distributed over bit periods of the serial data signal; filtering the samples to correct errors in the samples; and extracting a plurality of data bit values from the samples under the control of a clock signal associated with the device without adjusting a frequency of the clock signal, wherein each data bit value is associated with one of the bit periods of the serial data signal.

In accordance with another embodiment of the present invention, a device includes sampling blocks adapted to oversample a serial data signal received by the device to provide a plurality of samples distributed over bit periods of the serial data signal, wherein the serial data signal operates independently of the device; a sample error filter adapted to filter the samples to correct errors in the samples; and a data extraction block adapted to extract a plurality of data bit values from the samples under the control of a clock signal associated with the device without adjusting a frequency of the clock signal, wherein each data bit value is associated with one of the bit periods of the serial data signal.

In accordance with another embodiment of the present invention, a device includes means for receiving a serial data signal, wherein the serial data signal operates independently of the device; means for oversampling the serial data signal to provide a plurality of samples distributed over bit periods of the serial data signal; means for filtering the samples to correct errors in the samples; and means for extracting a plurality of data bit values from the samples under the control of a clock signal associated with the device without adjusting a frequency of the clock signal, wherein each data bit value is associated with one of the bit periods of the serial data signal.

In accordance with another embodiment of the present invention, a method of extracting data bit values from a serial data signal includes sampling the serial data signal to provide a set of samples; storing the sample set; simultaneously comparing overlapping subsets of the sample set against a plurality of given error patterns to detect whether a sample subset matches an error pattern; changing a sample subset that matches an error pattern to a corrected pattern associated with the error pattern; and extracting a data bit value from samples of the serial data signal that include the corrected pattern.

In accordance with another embodiment of the present invention, a method of extracting data bit values from a serial data signal includes sampling the serial data signal with multiple phases of a clock signal to provide a set of samples; storing the set of samples; applying a plurality of masks to the samples to identify a plurality of bit positions within the set of samples; and extracting data bit values from the bit positions identified by the masks.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Various techniques further described herein may be used to perform clock and data recovery for a serial data signal received by an electronic system or an electronic device such as a programmable logic device (PLD) or other integrated circuit. In one embodiment, the PLD oversamples a serial data signal that operates independently of the PLD. The PLD filters the samples to correct errors in the samples. Data bit values are extracted from the samples under the control of a clock signal associated with the PLD without adjusting a frequency of the clock signal. Advantageously, the extracted data bit values may be used by the PLD as desired under the control of the clock signal associated with the PLD without requiring adjustment of the serial data signal itself.

Figure 1:
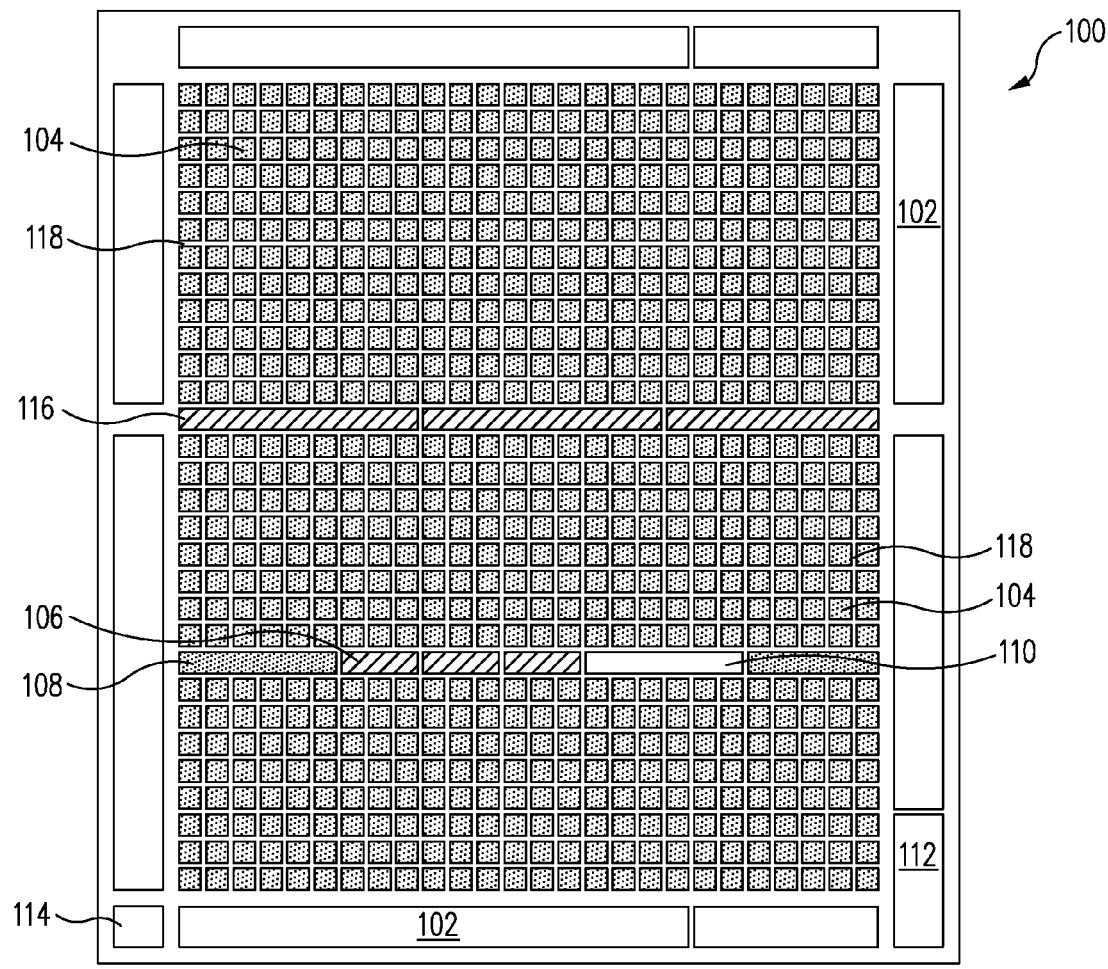
FIG. 1 illustrates a block diagram of a programmable logic device (PLD) in accordance with an embodiment of the invention.

FIG. 1 illustrates a block diagram of a programmable logic device (PLD) 100 in accordance with an embodiment of the invention. PLD 100 (e.g., a field programmable gate array (FPGA), a complex programmable logic device (CPLD), a field programmable system on a chip (FPSC), or other type of programmable device) generally includes input/output (I/O) blocks 102 and logic blocks 104 (e.g., also referred to as programmable logic blocks (PLBs), programmable functional units (PFUs), or programmable logic cells (PLCs)). I/O blocks 102 provide I/O functionality (e.g., to support one or more I/O and/or memory interface standards) for PLD 100, while programmable logic blocks 104 provide logic functionality (e.g., LUT-based logic or logic gate array-based logic) for PLD 100.

PLD 100 may also include blocks of memory 106 (e.g., blocks of EEPROM, block SRAM, and/or flash memory), clock-related circuitry 108 (e.g., PLL and/or DLL circuits), configuration logic 110 (e.g., for startup, decryption, encryption, multiple-boot support (e.g., dual boot support), and/or error detection), a configuration port 112, configuration memory 114, special function blocks 116 (e.g., digital signal processing (DSP) blocks or other forms of multiply and accumulate circuit functionality), and/or routing resources 118. In general, the various elements of PLD 100 may be used to perform their intended functions for the desired application, as would be understood by one skilled in the art.

For example, configuration port 112 may be used for programming PLD 100, such as memory 106 and/or configuration memory 114 or transferring information (e.g., various types of data and/or control signals) to/from PLD 100 as would be understood by one skilled in the art. For example, configuration port 112 may include a first programming port (which may represent a central processing unit (CPU) port, a peripheral data port, a serial peripheral interface, and/or a sysCONFIG programming port) and/or a second programming port such as a joint test action group (JTAG) port (e.g., by employing standards such as Institute of Electrical and Electronics Engineers (IEEE) 1149.1 or 1532 standards). Configuration port 112 typically, for example, may be included to receive configuration data and commands to support serial or parallel device configuration and information transfer.

It should be understood that the number and placement of the various elements, such as I/O blocks 102, logic blocks 104, memory 106, clock-related circuitry 108, configuration logic 110, configuration port 112, configuration memory 114, special function blocks 116, and routing resources 118, are not limiting and may depend upon the desired application. For example, special function blocks 116 are optional and various other elements may not be required for a desired application or design specification (e.g., for the type of programmable device selected).

Furthermore, it should be understood that the elements are illustrated in block form for clarity and that certain elements, such as for example configuration memory 114 or routing resources 118, would typically be distributed throughout PLD 100, such as in and between logic blocks 104, to perform their conventional functions (e.g., storing configuration data that configures PLD 100 or providing interconnect structure within PLD 100, respectively). It should also be understood that the various embodiments of the present invention as disclosed herein are not limited to programmable logic devices, such as PLD 100, and may be applied to various other types of programmable devices, as would be understood by one skilled in the art.

Figure 2:
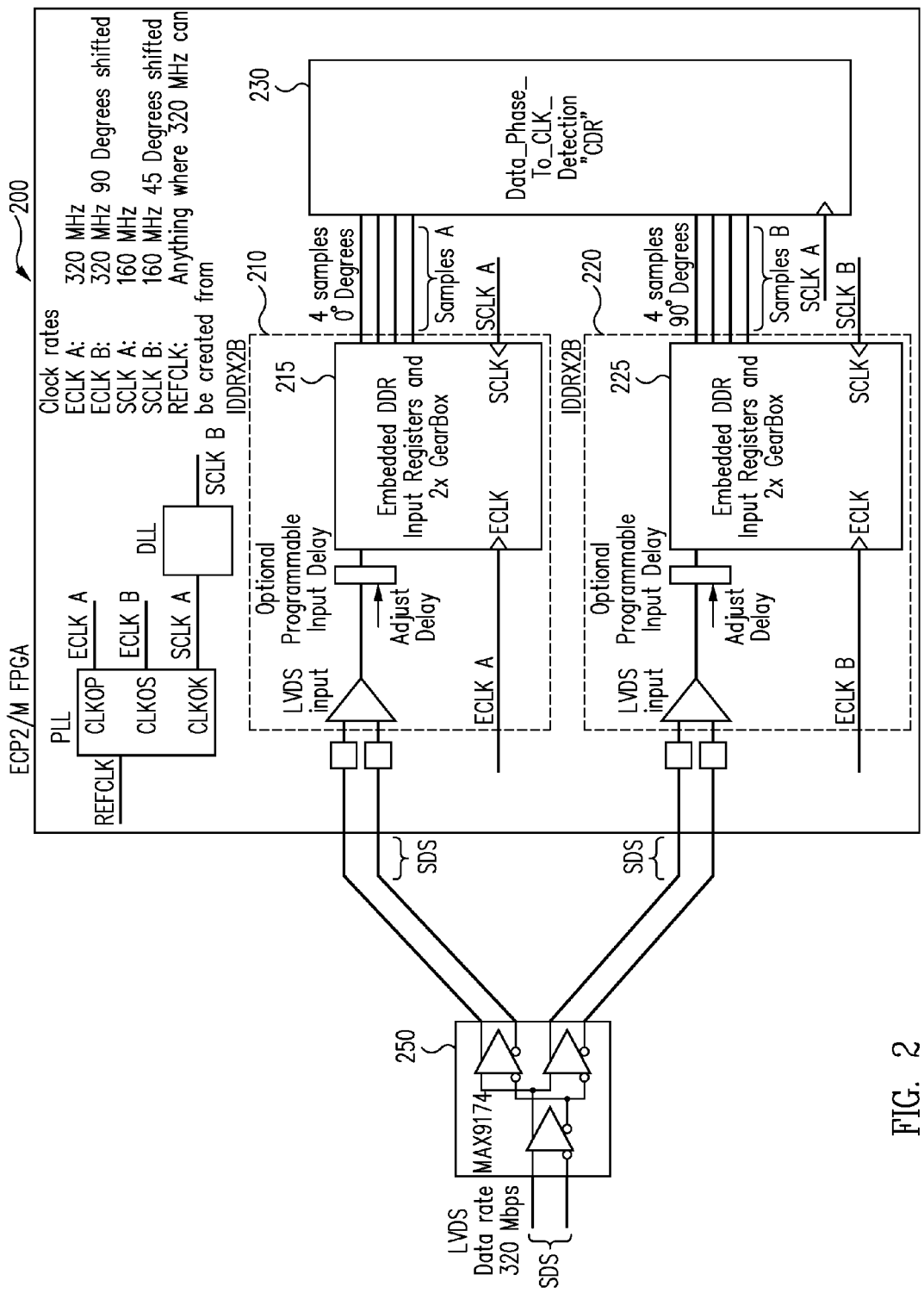
FIG. 2 illustrates a PLD and a serial data signal in accordance with an embodiment of the invention.

FIG. 2 illustrates a PLD 200 and a serial data signal SDS in accordance with an embodiment of the invention. In one embodiment, PLD 200 may be implemented by PLD 100 of FIG. 1, and signal SDS may be implemented as a low voltage differential signaling (LVDS) signal with a data rate in excess of approximately 200 Mbps (e.g., approximately 320 Mbps). Signal SDS is initially received by a splitter block 250 which provides two copies of signal SDS to PLD 200. In one embodiment, splitter block 250 may be external to PLD 200 and implemented by a MAX9174 LVDS-to-LVDS splitter available from Maxim Integrated Products of Sunnyvale, Calif.

As shown in FIG. 2, PLD 200 has been configured to provide sampling blocks 210 and 220, and a clock and data recovery (CDR) block 230. In this regard, it will be appreciated that sampling blocks 210 and 220, and CDR block 230 may be implemented by logic blocks (e.g., logic blocks 104) configured by appropriate configuration data residing in configuration memory (e.g., configuration memory 114).

Sampling blocks 210 and 220 include double data rate (DDR) blocks 215 and 225, respectively, which may be used to sample signal SDS in response to clock signals ECLK A, ECLK B, SCLK A, and SCLK B which may be implemented in the manner further illustrated in FIG. 2. In one embodiment, PLD 200 may be configured to implement each of DDR blocks 215 and 225 in accordance with an IDDRX2B software primitive available from Lattice Semiconductor Corporation of Hillsboro, Oreg.

DDR block 215 provides four samples A distributed over two bit periods of signal SDS (e.g., samples A are taken at approximately 180 degree intervals of signal SDS). DDR block 225 provides an additional four samples B distributed over the same two bit periods of signal SDS (e.g., samples B are taken at approximately 180 degree intervals of signal SDS, but are shifted approximately 90 degrees relative to samples A). Accordingly, samples A and B collectively provide 8 samples distributed at approximately 90 degree intervals over two bit periods of signal SDS. Samples A and B are provided to CDR block 230 for further processing as described herein.

Figure 3A:
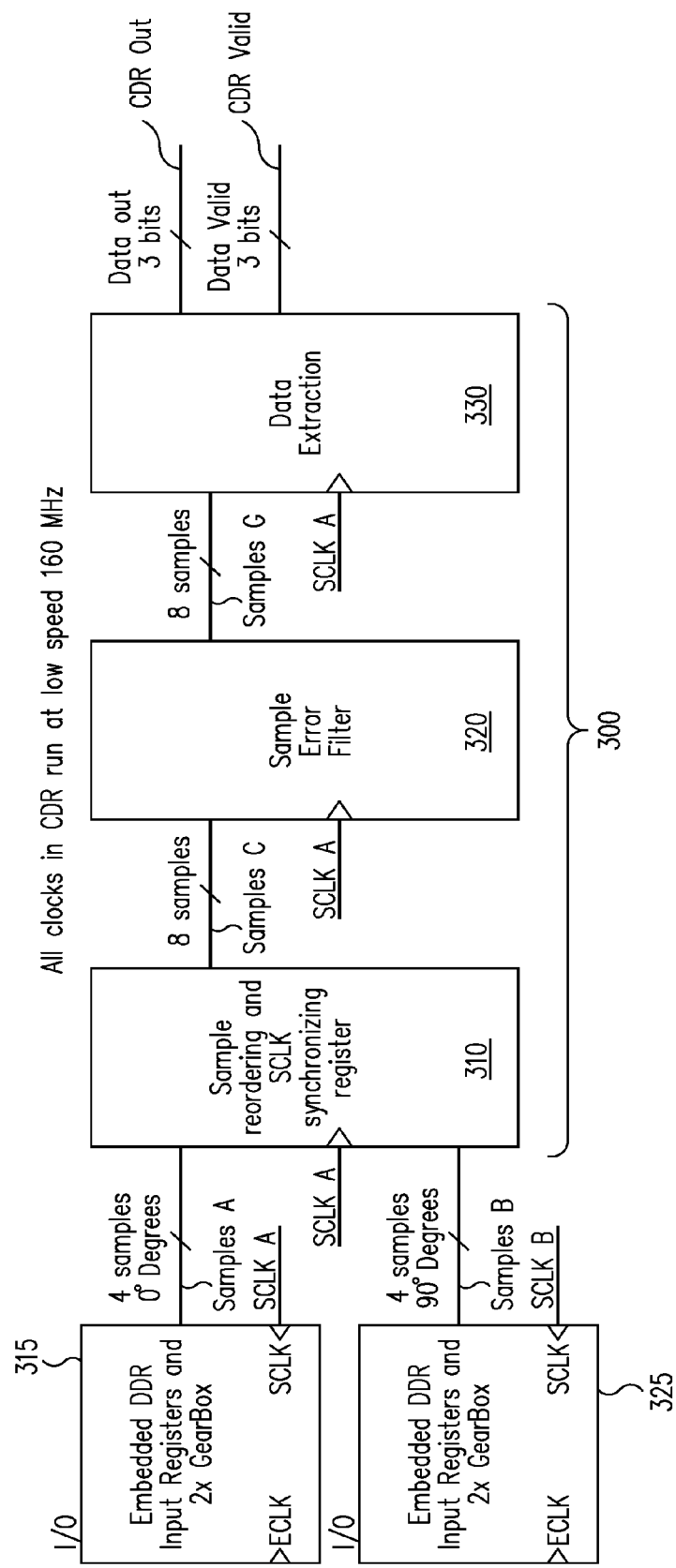
FIG. 3A illustrates a clock and data recovery block and double data rate blocks of a PLD in accordance with an embodiment of the invention.

FIG. 3A illustrates a CDR block 300 and DDR blocks 315 and 325 of PLD 100 or 200 in accordance with an embodiment of the invention. In one embodiment, CDR block 300 may be used to implement CDR block 230 of FIG. 2 described above. CDR block 300 includes sample reordering logic 310, a sample error filter 320, and a data extraction block 330.

In one embodiment, a device (e.g., PLD 100, PLD 200, or another device) may be implemented with means such as I/O blocks 102 for receiving a serial data signal, wherein the serial data signal operates independently of the device. The device may also be implemented with means such as DDR blocks 315 and 325 for oversampling the serial data signal to provide a plurality of samples distributed over bit periods of the serial data signal. The device may further be implemented with means such as sample error filter 320 for filtering the samples to correct errors in the samples. In addition, the device may be implemented with means such as data extraction block 330 for extracting a plurality of data bit values from the samples under the control of a clock signal associated with the device without adjusting a frequency of the clock signal, wherein each data bit value is associated with one of the bit periods of the serial data signal.

Figure 3B:
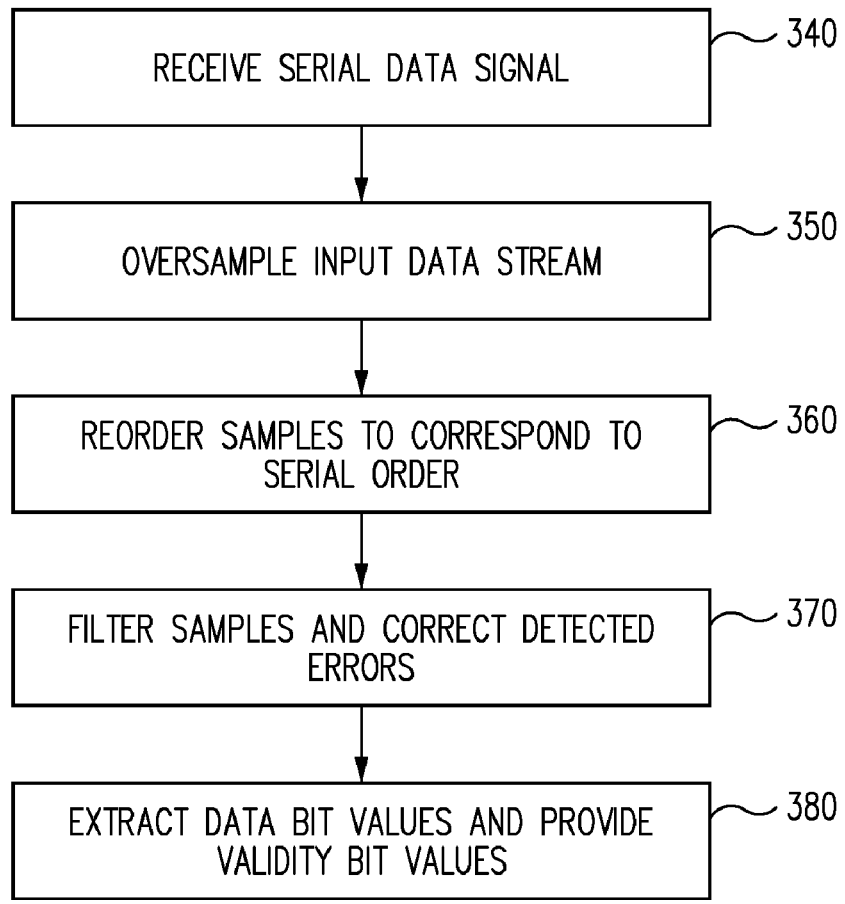
FIG. 3B illustrates a process for performing clock and data recovery in accordance with an embodiment of the invention.

FIG. 3B illustrates a process for performing clock and data recovery using CDR block 300 and DDR blocks 315 and 325 in accordance with an embodiment of the invention. In step 340, each of DDR blocks 315 and 325 (e.g., which may be implemented by DDR blocks 215 and 225 described above) receive copies of signal SDS (e.g., provided by splitter block 250 of FIG. 2). In step 350, DDR blocks 315 and 325 oversample their respective copies of signal SDS to provide samples A and samples B, respectively, as previously discussed.

Figure 4:
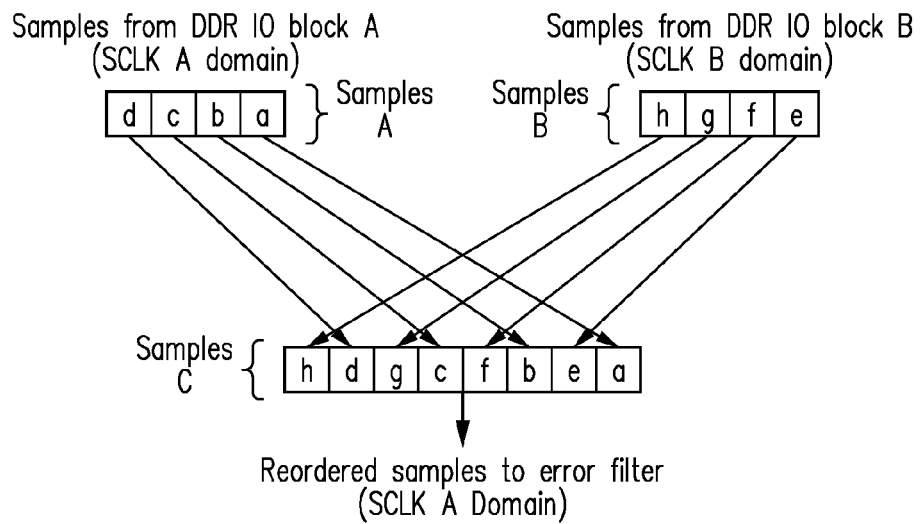
FIG. 4 illustrates a reordering of samples performed in accordance with an embodiment of the invention.

In step 360, sample reordering logic 310 reorders samples A and samples B received from DDR blocks 315 and 325, respectively, to provide samples C. In this regard, FIG. 4 illustrates a reordering of samples A and samples B performed by sample reordering logic 310 during step 360 in accordance with an embodiment of the invention. As shown in FIG. 4, sample reordering logic 310 reorders samples A and samples B to provide samples C in a sequential order. As a result, in one embodiment, samples C correspond to 8 sequential samples of signal SDS distributed at approximately 90 degree intervals over two bit periods.

Referring again to FIG. 3B, in step 370, sample error filter 320 receives samples C from sample reordering logic 310 and operates on samples C to identify and correct possible errors in samples C to provide corrected samples G to data extraction block 330. In step 380, data extraction block 330 extracts data bit values from samples G to provide data bit values CDR Out and validity bit values CDR Valid.

Figure 5A:
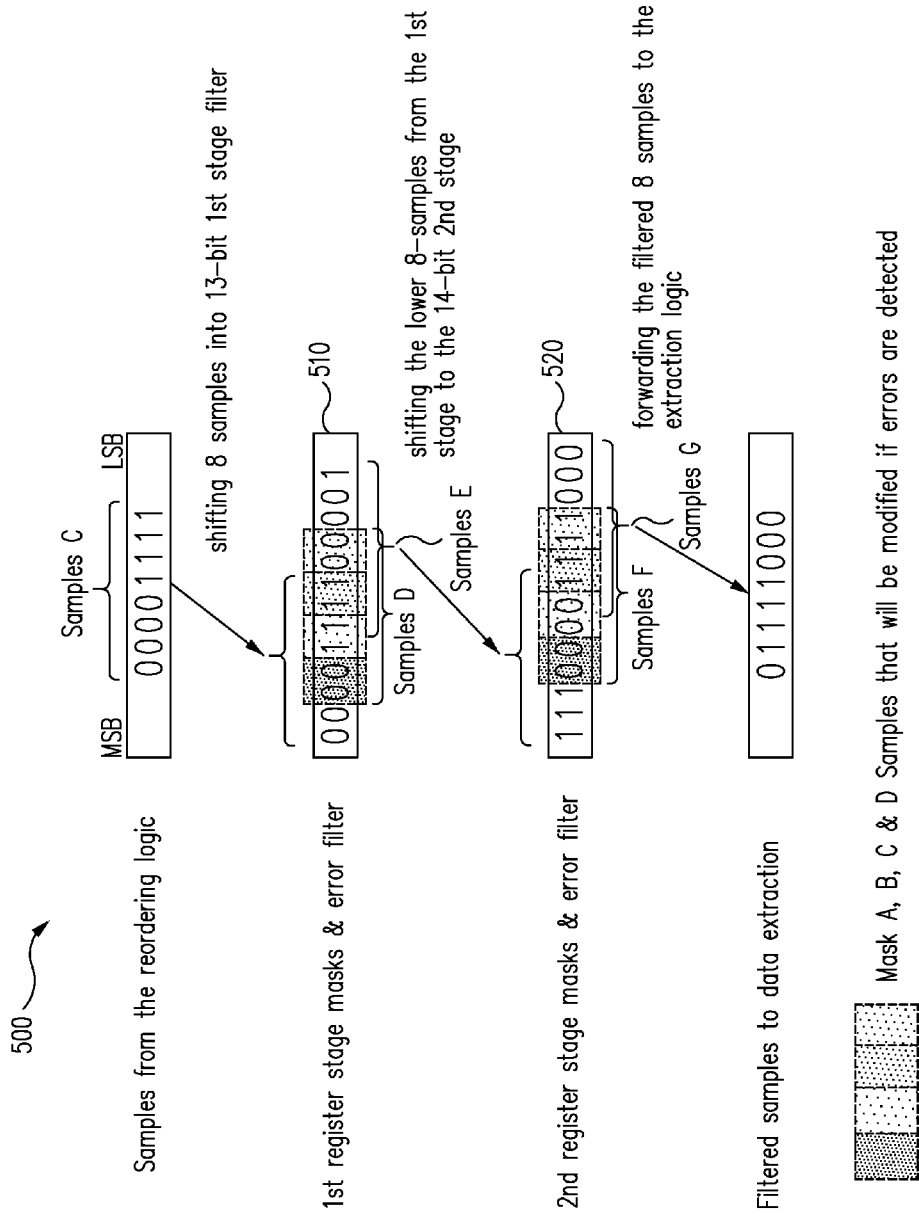
FIG. 5A illustrates an implementation of a sample error filter in accordance with an embodiment of the invention.

FIG. 5A illustrates an implementation of a sample error filter 500 in accordance with an embodiment of the invention. In one embodiment, sample error filter 500 may be used to implement sample error filter 320 described above. Sample error filter 500 includes a 13-bit shift register 510, a 14-bit shift register 520, and a plurality of masks A, B, C, and D which may be applied to samples residing in shift registers 510 and 520. In one embodiment, each of masks A, B, C, and D is implemented by a corresponding logic table to implement the filtering further described herein.

In one embodiment, sample error filter 500 identifies and corrects short duration "spikes" in the values of samples C which correspond to time periods that are significantly shorter than bit periods of signal SDS and therefore are not attributable to actual changes in data bit values of signal SDS.

As one example, two 1-bit spikes (e.g., 01) in samples "1101000" may be inverted to provide samples "1110000." As another example, a 1-bit spike (e.g., 0) in samples "1110111" may be inverted to provide samples "1111111." As yet another example, a 2-bit spike (e.g., 00) in samples "111001111" may be stretched to three bits to provide samples "111000111." As a further example, a 1-bit spike (e.g., 1) followed by a 2-bit spike (e.g., 00) in samples "1110100111" may be corrected to provide samples "1110000111."

Fluctuations in the values of samples C which last for only one or two samples may be attributed to, for example, sampling errors, jitter, noise, data skew, or other types of errors. By identifying and correcting such errors, a PLD that receives signal SDS may avoid inadvertently extracting erroneous data bit values caused by spikes in samples C and thus improve the accuracy at which signal SDS is extracted by the PLD.

Figure 5B:
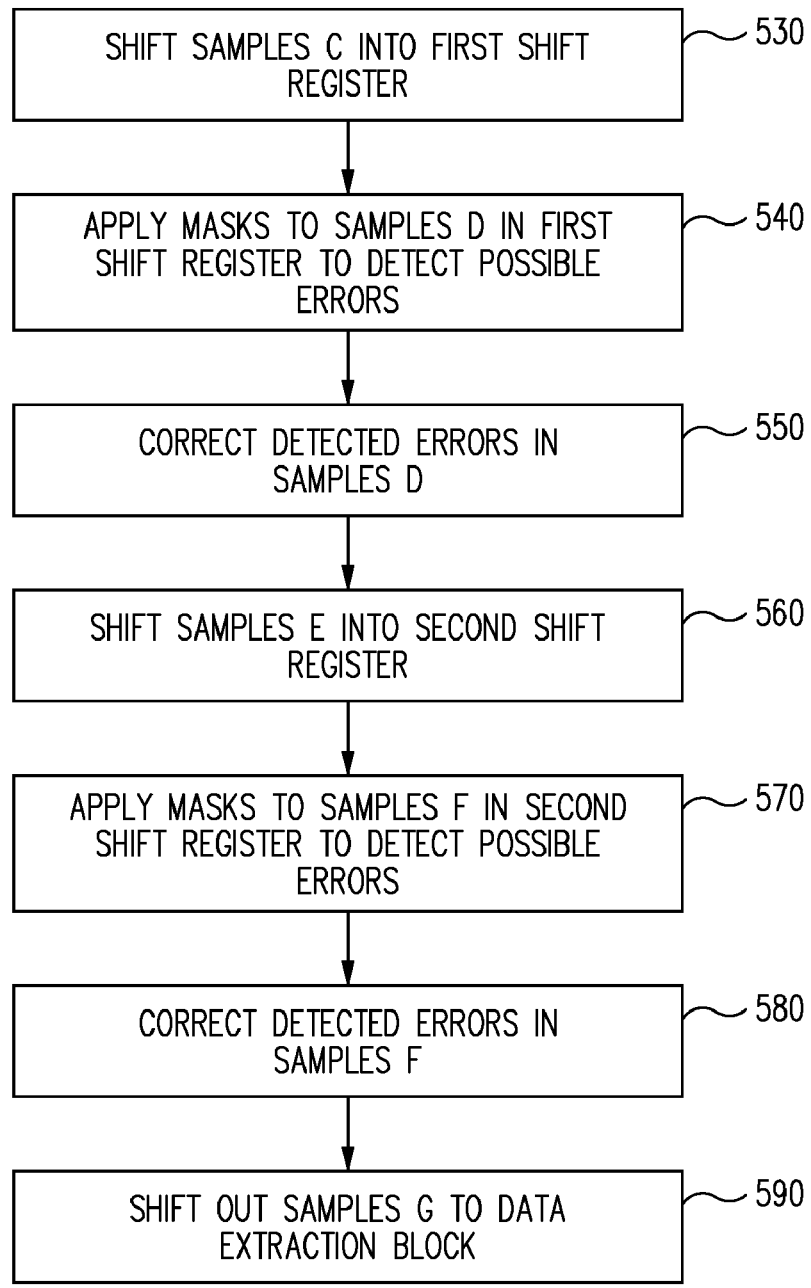
FIG. 5B illustrates a process for performing sample error filtering in accordance with an embodiment of the invention.

The operation of sample error filter 500 can be further understood from FIG. 5B which illustrates a process for performing sample error filtering using sample error filter 500 in accordance with an embodiment of the invention. In step 530, eight bits of samples C received from sample reordering logic 310 are shifted into 13-bit shift register 510 which stores resident samples D. In step 540, sample error filter 500 applies masks A, B, C, and D to associated subsets of samples D stored by shift register 510 to detect possible errors in samples D.

Figure 6:
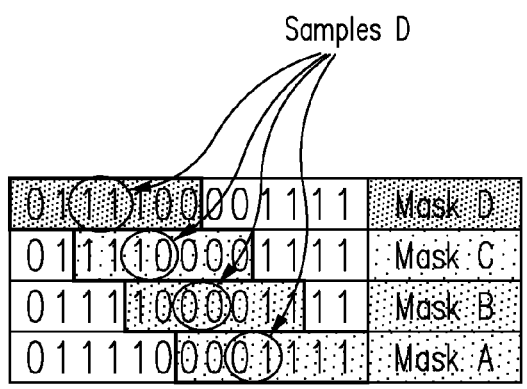
FIG. 6 illustrates a plurality of masks applied by a sample error filter in accordance with an embodiment of the invention.

In this regard, FIG. 6 illustrates the application of masks A, B, C, and D by sample error filter 500 to samples D of shift register 510 during step 540 in accordance with an embodiment of the invention. As shown in FIG. 6, masks A, B, C, and D are applied in parallel in a single clock cycle to four corresponding subsets (e.g., 7-bit overlapping subsets) of samples D stored by shift register 510. Using masks A, B, C, and D, sample error filter 500 identifies whether bit values associated with any two samples of each mask should be corrected. Following the detection of errors in step 540, sample error filter 500 corrects the detected errors in step 550.

The following Table 1 identifies various 7-bit error patterns that may be detected by masks A, B, C, and D as residing in resident samples D of shift register 510 in step 540, as well as various 7-bit corrected patterns that may be provided by sample error filter 500 to correct the detected error patterns in step 550.

TABLE 1

| Detected Error Pattern | Corrected Pattern |
| --- | --- |
| 0010111 | 0001111 |
| 0010110 | 0001110 |
| 1101000 | 1110000 |
| 1101001 | 1110001 |
| 1110011 | 1100011 |
| 1010011 | 1100011 |
| 1010010 | 1100010 |
| 0001100 | 0011100 |
| 0101100 | 0111100 |
| 0101101 | 0111101 |
| 1110111 | 1111111 |
| 0001000 | 0000000 |

As shown in Table 1 and illustrated in FIG. 6, corrections if needed are made to the third and/or fourth most significant bits of the detected error patterns (e.g., the third and/or fourth bits counting from the leftmost bit are inverted in the corrected patterns). Because masks A, B, C, and D are applied simultaneously in parallel to subsets of the samples stored by shift register 510, up to eight bits of samples D may be simultaneously corrected during one clock cycle.

Upon inspection of Table 1, it will be appreciated that, in one embodiment, sample error filter 500 does not pass through sample spikes that are shorter than three samples. In this embodiment, 1-bit spikes are determined to be external interference thus not actual data bit values to be detected. Also in this embodiment, 2-bit spikes are stretched to three samples to address possible corruption of either edge of a sampled data bit value.

During step 550, sample error filter 500 may invert appropriate bit values of samples D in shift register 510 to replace the detected error patterns found in samples D with the corrected patterns identified in Table 1. In step 560, the corrected patterns are shifted from shift register 510 to shift register 520 in 8-bit groups as samples E.

In step 570, sample error filter 500 applies masks A, B, C, and D to 7-bit overlapping subsets of resident samples F in 14-bit shift register 520 as similarly described above with regard to samples D and shift register 510 in step 540. In step 580, sample error filter 500 corrects the detected errors in samples F in shift register 520 as similarly described above with regard to samples D and shift register 510 in step 550. In step 590, the corrected patterns are shifted from shift register 520 to data extraction block 330 in eight bit groups as samples G.

Advantageously, by using the two filtering stages provided by shift registers 510 and 520, errors occurring across mask boundaries (e.g., errors which would not necessarily be detected by considering only samples D in shift register 510) can also be detected and corrected. In this regard, as shown in FIG. 5A, samples E provided to shift register 520 include overlapping samples that are present in both samples D and samples F. By applying masks A, B, C, and D to these overlapping samples (e.g., as part of samples F), errors occurring at the boundaries of masks A, B, C, and D can be detected and corrected.

Figure 7:
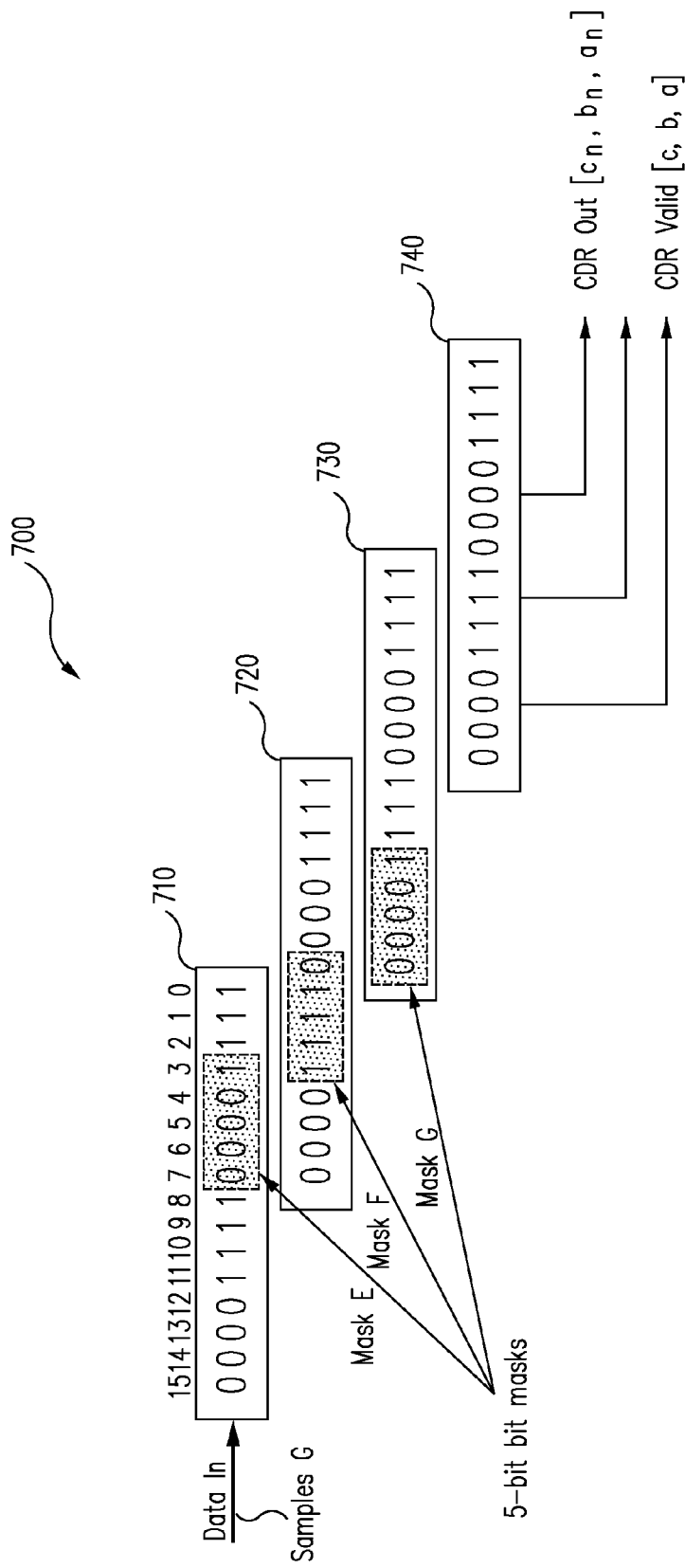
FIG. 7 illustrates an implementation of a data extraction block in accordance with an embodiment of the invention.

FIG. 7 illustrates an implementation of a data extraction block 700 in accordance with an embodiment of the invention. In one embodiment, data extraction block 700 may be used to implement data extraction block 330 described above. Data extraction block 700 includes a pipeline of 16-bit registers 710, 720, 730, and 740.

In one embodiment, register 710 is a 16-bit shift register that receives 8 samples per clock cycle (e.g., samples G) from a sample error filter, such as sample error filter 320. During each clock cycle, new sets of 8 samples are shifted into the 8 leftmost bit positions of register 710, while the previous samples residing in the 8 leftmost bit positions are shifted into the rightmost bit positions of register 710. Thus, the leftmost 8 samples held by register 710 (e.g., bit positions 8 to 15) include the most recent set of samples G received by data extraction block 700, while the rightmost 8 samples held by register 710 (e.g., bit positions 0 to 7) include the set of samples G received by data extraction block 700 during the previous clock cycle.

The 8 samples G received by register 710 correspond to corrected versions of samples C previously described herein. Accordingly, it will be appreciated that the 8 samples G are distributed at approximately 90 degree intervals over two bit periods of signal SDS. The 16 samples maintained in register 710 correspond to two sets of samples G sequentially received by data extraction block 700. Thus, the 16 samples maintained in register 710 correspond to 16 samples distributed over 4 bit periods of signal SDS (e.g., 4 samples per bit period).

During each clock cycle, all 16 samples of register 710 are passed to register 720. Registers 720 and 730 similarly pass their associated 16 samples down the pipeline during each clock cycle. Because only 8 new samples G are shifted into the pipeline during each clock cycle, there will be overlap between the samples shared by the various registers 710, 720, 730, and 740. In particular, the eight leftmost samples of registers 720, 730, and 740 will correspond to the eight rightmost samples of registers 710, 720, and 730, respectively. Thus, although each of registers 710, 720, 730, and 740 will hold 16 samples distributed over 4 bit periods of signal SDS, the two bit periods represented by the leftmost 8 bits of registers 710, 720, 730, and 740 during a given clock cycle will be represented by the rightmost 8 bits in registers 710, 720, 730, and 740 during the next clock cycle.

Data extraction block 700 also includes a plurality of 5-bit masks E, F, and G which may be applied to subsets of samples residing in registers 710, 720, and 730. In one embodiment, each of masks E, F, and G is implemented by a corresponding logic table to identify data bit values to be extracted from corresponding subsets of samples to which the masks are applied. The positions of masks E, F, and G may be adjusted left and right in registers 710, 720, and 730, respectively.

Figure 8:
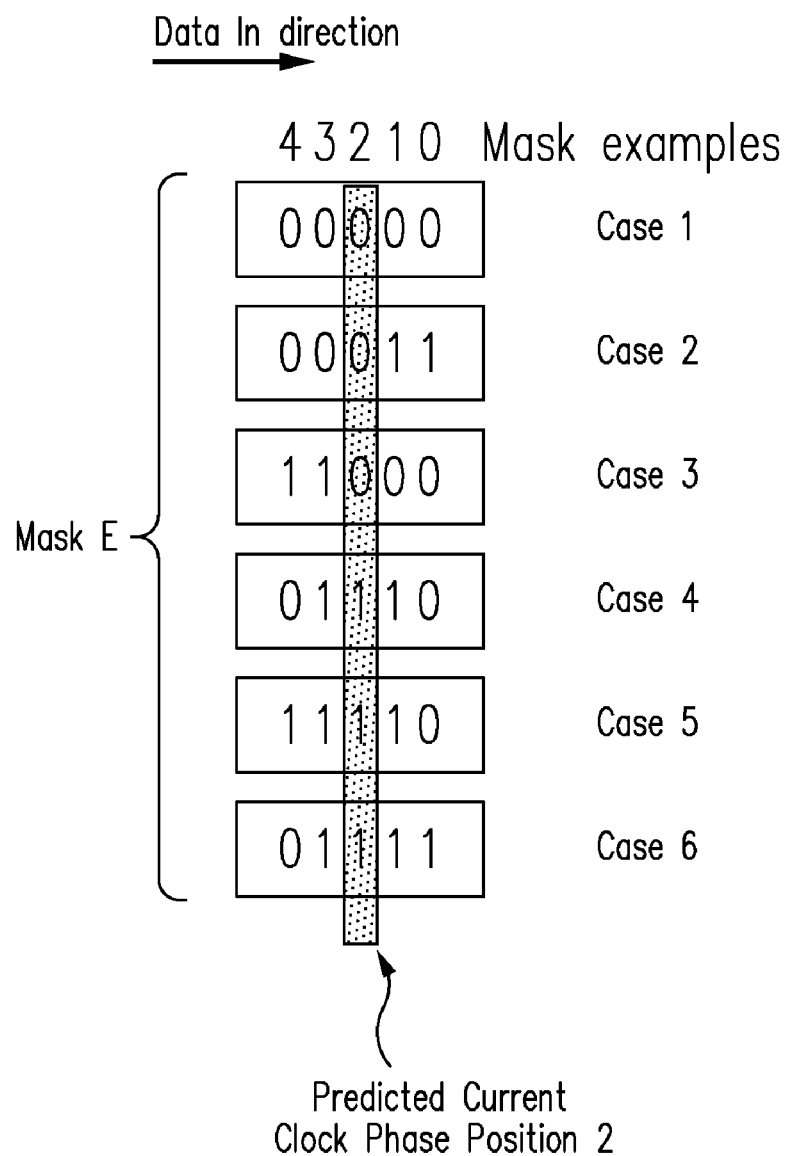
FIG. 8 illustrates an application of a mask of a data extraction block to various samples in accordance with an embodiment of the invention.

FIG. 8 illustrates examples of different samples in mask E in accordance with an embodiment of the invention. As shown in FIG. 8, the 5 samples in mask E correspond to positions 0 to 4 (e.g., clock phase positions) in the order the samples are received by data extraction block 700. In this regard, bit position 2 corresponds to the centermost sample of mask E.

Based on the different combinations of samples in mask E, data extraction block 700 may selectively adjust the position of mask E within register 710. For example, the following Table 2 identifies various actions that may be taken by data extraction block 700 in response to different combinations of samples in mask E that are illustrated in FIG. 8.

TABLE 2

| Samples in Mask | Case | Detected Condition Based on Contents of Mask | Action Taken |
|---|---|---|---|
| 00000 | 1 | Input data stream is constant and stable | Maintain current mask position to keep centermost bit position in middle of samples of same sample value |
| 00011 | 2 | Edge detected and the remains of the previous bit are seen at the two oldest samples of the mask | Slide mask 1 position to the left to move centermost bit position away from edge |
| 11000 | 3 | Edge detected and the first samples of the new bit are seen at the two youngest samples of the mask | Slide mask 1 position to the right to move centermost bit position away from edge |
| 01110 | 4 | Short data pulse of only 3 samples detected; predict that the position to the left of centermost position may be one sample position early and that the samples of the next bit value may only include 3 samples | Maintain the current mask position to keep centermost bit position in middle of samples of same sample value |
| 11110 | 5 | Stable data after an edge | Maintain the current mask position to keep centermost bit position in middle of samples of same sample value |
| 01111 | 6 | Stable data followed by an edge | Slide mask 1 position to the right to move centermost bit position further away from the incoming edge |

As identified in Table 2, data extraction block 700 may selectively adjust the position of mask E within register 710 to the left, to the right, or maintain the current position of mask E. In one embodiment, data extraction block 700 may perform the same actions identified in Table 2 if the combinations of samples are inverted. For example, if mask E detects samples "11100" then it may perform the same action as identified in Table 2 above for samples "00011." For all other combinations of samples, data extraction block 700 may maintain the current mask position.

Referring again to FIG. 7, the position of mask F within register 720 may be determined based on the position of mask E within register 710. In one embodiment, mask F may be positioned four bits to the left of the position of mask E as shown in FIG. 7. Accordingly, as mask E is moved to the left or right within register 710, mask F will be moved in a corresponding fashion within register 720.

The position of mask G within register 730 may be determined based on the position of mask F within register 720. In one embodiment, mask G may be positioned four bits to the left of the position of mask F as shown in FIG. 7. Accordingly, as mask F is moved to the left or right within register 720, mask G will be moved in a corresponding fashion within register 730.

As also shown in FIG. 7, data extraction block 700 provides data bit values CDR Out and validity bit values CDR Valid. Data bit values CDR Out are the bit values (e.g., 0 or 1) extracted by data extraction block. In particular, data bit values CDR Out correspond to bit values maintained in bit positions $a_n$, $b_n$, and $c_n$ of register 740. These bit positions are determined by masks E, F, and G, respectively, as further described herein. Data bit values CDR Out are passed to other portions of PLD 100/200 or another appropriate device to represent the data encoded in signal SDS.

Validity bit values CDR Valid identify whether corresponding data bit values CDR Out should be used to represent the data encoded in signal SDS. For example, during normal operation, masks E and F will be used to identify bit values, but mask G will be unused. In this case, validity bit values CDR Valid [a] and [b] will be set to indicate that data bit values CDR Out $[a_n]$ and $[b_n]$ should be used, but validity bit value CDR Valid [c] will not be set to indicate that data bit value CDR Out $[c_n]$ should not be used. During other operations, different validity bit values CDR Valid may be set to selectively use different combinations of masks E, F, and G as further described herein.

Figure 9:
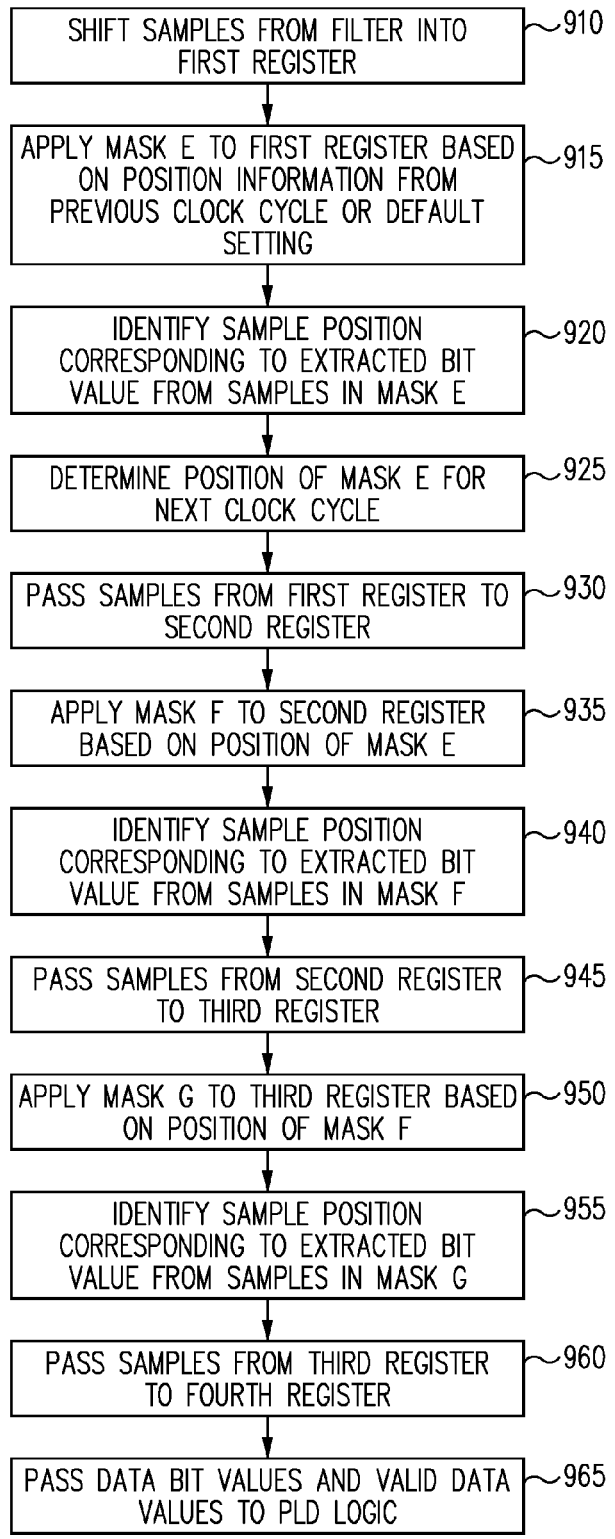
FIG. 9 illustrates a process for performing data extraction in accordance with an embodiment of the invention.

FIG. 9 illustrates a process for performing data extraction using data extraction block 700 in accordance with an embodiment of the invention. In step 910, during a first clock cycle (e.g., during a clock cycle of clock signal SCLK A), samples G from error filter 320 are shifted into register 710. The leftmost 8 samples held by register 710 include samples G shifted in during step 910, while the rightmost 8 samples held by register 710 include the set of samples G received by data extraction block 700 during the previous clock cycle.

In step 915, data extraction block 700 applies mask E to a subset of samples in register 710. As previously discussed, the position of mask E may be adjusted left and right in register 710. In this regard, the initial position of mask E during step 915 may be determined based on a default value (for example, positioned as shown in FIG. 7) or a position determined in a previous iteration of step 925 which is further described herein.

Based on the application of mask E, data extraction block 700 identifies a bit position $a_n$ within mask E corresponding to a data bit value to be extracted from the samples in mask E (step 920). For example, in one embodiment, the centermost bit position of mask E is identified. In another embodiment, the bit position is selected from a range of the three centermost bit positions of mask E. For example, the bit position may be selected based on a data edge transition (e.g., a transition between data bit values) detected by mask E.

In step 925, based on the application of mask E, data extraction block 700 identifies the position of mask E to be used during the next clock cycle. For example, in one embodiment, the next position of mask E may be determined as previously discussed with regard to FIG. 8 and Table 2.

In another embodiment, if mask E is currently positioned at the extreme right side of register 710 (e.g., centered at bit position 2 of register 710), then the next position of mask E determined in step 925 may be shifted four samples to the left (e.g., centered at bit position 6 of register 710). This approach prevents mask E from being shifted in a manner that extends mask E beyond the rightmost bound of register 710. As further described herein, mask G may be used in this case to identify a bit value which would otherwise be lost due to the four sample shift of mask E.

In another embodiment, if mask E is positioned at bit position 8 of register 710, then the next position of mask E determined in step 925 may be shifted four samples to the right to bit position 4 of register 710. This approach prevents mask E from being shifted in a manner that causes mask F to extend beyond the leftmost bound of register 720 (e.g., in cases where the position of mask F is shifted four bits to the left of mask E). As further described herein, mask F may be unused in this case to prevent the same bit value from being identified by both masks E and F due to the four sample shift of mask E.

During the next clock cycle, in step 930, data extraction block 700 passes the samples of register 710 on to register 720. In step 935, data extraction block 700 applies mask F to a subset of samples in register 720. In one embodiment, the position of mask F within register 720 may be determined based on the position of mask E within register 710 as previously discussed.

In step 940, data extraction block 700 identifies a bit position $b_n$ within mask F corresponding to a data bit value to be extracted from the samples in mask F based on the application of mask F. For example, in one embodiment, the centermost bit position of mask F is identified. In another embodiment, the bit position is selected from a range of the three centermost bit positions of mask F. For example, the bit position may be selected based on a data edge transition (e.g., a transition between data bit values) detected by mask F.

During the next clock cycle, in step 945, data extraction block 700 passes the samples of register 720 on to register 730. In step 950, data extraction block 700 applies mask G to a subset of samples in register 730. As previously discussed, the position of mask G within register 720 may be determined based on the position of mask F within register 720.

In step 955, data extraction block 700 identifies a bit position $c_n$ within mask G corresponding to a data bit value to be extracted from the samples in mask G based on the application of mask G. For example, in one embodiment, the centermost bit position of mask G is identified. In another embodiment, the bit position is selected from a range of the three centermost bit positions of mask G. For example, the bit position may be selected based on a data edge transition (e.g., a transition between data bit values) detected by mask G.

During the next clock cycle, in step 960, data extraction block 700 passes the samples of register 730 on to register 740. In step 965, data extraction block 700 provides data bit values CDR Out and validity bit values CDR Valid.

As previously described, data bit values CDR Out are the bit values of the samples in register 740 corresponding to selected bit positions $a_n$, $b_n$, and $c_n$ determined by masks E, F, and G, respectively. As also previously described, validity bit values CDR Valid identify whether corresponding data bit values CDR Out should be used to represent the data encoded in signal SDS.

The 16 samples maintained in register 740 correspond to two sets of samples G sequentially received by data extraction block 700 (e.g., passed down from register 710 through the pipeline of FIG. 7). Thus, the 16 samples maintained in register 710 correspond to 16 samples distributed over 4 bit periods of signal SDS (e.g., 4 samples per bit period). Also, because samples G are shifted in to data extraction block 700 in groups of 8 during each clock cycle, the 8 leftmost samples of register 740 during a given clock cycle will become the 8 rightmost samples of register 740 during the next clock cycle.

Normally during step 965, masks E and F will be used to identify bit values, but mask G will be unused (e.g., validity bit values CDR Valid [a] and [b] will be set, and [c] will not be set). In this case, masks E and F may be used to select two data bit values CDR Out $[a_n]$ and $[b_n]$ from register 740 during a given clock cycle. During the next clock cycle, masks E and F may be used to select two additional data bit values CDR Out $[a_n]$ and $[b_n]$ from register 740.

For example, if masks E and F are both positioned to select data bit values from the rightmost 8 samples of register 740 (e.g., assuming that mask F is positioned four bits to the left of mask E), then a bit value from each of two bit periods represented by register 740 may be selected during a first clock cycle. As discussed, the 8 leftmost samples of register 740 become the 8 rightmost samples of register 740 during the next clock cycle. Thus, by continuing to apply masks E and F to the rightmost 8 samples of register 740 during the next clock cycle, a bit value from each of two additional bit periods represented by register 740 may be selected during the next clock cycle. Thus, a bit value for each of the four bit periods of signal SDS represented by the samples of register 740 may be extracted using only masks E and F during normal operation.

It will be appreciated that as the positions masks E and F change, a bit value for each of the four bit periods of signal SDS represented by the samples of register 740 can still be extracted using only masks E and F over two clock cycles. This is due to the shifting of samples G in sets of 8 samples which causes overlap between the samples stored by register 740 in successive clock cycles. This is also due to the four bit separation between masks E and F which permits bit values of two clock periods of signal SDS to be determined within each set of 8 samples.

In another embodiment, mask G is used during step 965. For example, as previously discussed, if mask E is currently positioned at the extreme right side of register 710 (e.g., centered at bit position 2 of register 710), then the next position of mask E determined in step 925 may be shifted four samples to the left (e.g., centered at bit position 6 of register 710) to prevent mask E from being shifted in a manner that extends mask E beyond the rightmost bound of register 710. In this case, mask G is used to identify the bit value of bit position 10 which would otherwise be lost due to the four sample shift of mask E. Accordingly, in this case, validity bit value CDR Valid [c] will be set and data bit value CDR Out $[c_n]$ will be extracted during step 965.

In another embodiment, mask E is not used during step 965. For example, as also previously discussed, if mask E is positioned at bit position 8 of register 710, then the next position of mask E determined in step 925 may be shifted four samples to the right to bit position 4 of register 710 to prevent mask E from being shifted in a manner that causes mask F to extend beyond the leftmost bound of register 720. In this case, mask F is disabled to prevent the same bit value from being identified by both masks E and F due to the four sample shift of mask E. As a result, the bit value which would have been identified by mask F will instead be identified by the newly shifted position of mask E. Accordingly, in this case, validity bit value CDR Valid [b] will not be set and data bit value CDR Out $[b_n]$ will not be extracted during step 965.

Any of data bit values CDR Out which are valid (e.g., as indicated by validity bit values CDR Valid) may be used by PLD 100/200 or other appropriate devices under the control of a local clock signal (e.g., clock signal SCLK A) without adjusting the frequency of the local clock signal. PLD 100/200 or other appropriate devices may perform further processing as desired using data bit values CDR Out to represent the data bit values encoded in signal SDS.

Embodiments described above illustrate but do not limit the invention, which can be implemented using a variety of devices including general logic devices, standard cell and structured application-specific integrated circuits (ASICs), and programmable devices such as described above. It should also be understood that numerous modifications and variations are possible in accordance with the principles of the present invention. Accordingly, the scope of the invention is defined only by the following claims.

We claim:

1. A method of synchronizing data, the method comprising:
   receiving a serial data signal at a device, wherein the serial data signal operates independently of the device;
   oversampling the serial data signal to provide a plurality of samples distributed over bit periods of the serial data signal;
   filtering the samples to detect errors in the samples;
   correcting a detected error in a sample by inverting the bit value of the sample; and
   extracting a plurality of data bit values from the samples, wherein each data bit value is associated with one of the bit periods of the serial data signal;
   wherein the extracting comprises:
     receiving the samples into a register;
     applying a mask to a subset of the samples in the register centered around a bit position;
     identifying one of the data bit values in response to the applying the mask; and
     selectively adjusting the bit position in response to the applying the mask; and
   wherein the register is a first register, the mask is a first mask, the subset of the samples is a first subset of the samples, the bit position is a first bit position, the one of the data bit values is a first one of the data bit values, and the extracting further comprises:
     passing the samples from the first register to a second register;
     applying a second mask to a second subset of the samples in the second register centered around a second bit position, wherein the second bit position is determined based on the adjusted first bit position; and
     identifying a second one of the data bit values in response to the applying the second mask.

2. The method of claim 1, wherein the oversampling comprises:
   generating first and second copies of the serial data signal;
   sampling the first copy of the serial data signal to provide a first subset of the samples;
   sampling the second copy of the serial data signal to provide a second subset of the samples; and sequentially ordering the samples, wherein the samples are distributed over the bit periods of the serial data signal at approximately 90 degree intervals.

3. The method of claim 1, wherein the filtering comprises: applying a plurality of masks to the samples to detect errors in the samples.

4. The method of claim 1, wherein the filtering comprises: receiving the samples at a first register;
applying a plurality of masks to the samples in the first register to detect errors in associated subsets of the samples in the first register;
receiving the samples at a second register; and
applying the masks to the samples in the second register to detect additional errors in different associated subsets of the samples in the second register.

5. The method of claim 1, wherein the extracting comprises applying a plurality of masks to the samples to identify the data bit values.

6. The method of claim 1, wherein the one of the data bit values is a first one of the data bit values, the method further comprises repeating the method using the adjusted bit position to identify a second one of the data bit values.

7. The method of claim 1, wherein the errors are associated with jitter in the serial data signal.

8. The method of claim 1, wherein the serial data signal operates at a frequency in excess of approximately 200 Mbps.

9. The method of claim 1, wherein the device is a programmable logic device (PLD).

10. A device comprising:
sampling blocks adapted to oversample a serial data signal received by the device to provide a plurality of samples distributed over bit periods of the serial data signal, wherein the serial data signal operates independently of the device;
a sample error filter adapted to filter the samples to detect errors in the samples and further adapted to correct a detected error in a sample by inverting the bit value of the sample; and
a data extraction block adapted to extract a plurality of data bit values from the samples, wherein each data bit value is associated with one of the bit periods of the serial data signal;
wherein the data extraction block comprises:
a register adapted to receive the samples from the sample error filter; and
logic adapted to apply a mask to a subset of the samples in the register centered around a bit position, identify one of the data bit values, and selectively adjust the bit position based on the subset of the samples; and
wherein the register is a first register, the mask is a first mask, the subset of the samples is a first subset of the samples, the bit position is a first bit position, the one of the data bit values is a first one of the data bit values, and the data extraction block further comprises:
a second register adapted to receive the samples from the first register and
logic adapted to apply a second mask to a second subset of the samples in the second register centered around a second bit position and to identify a second one of the data bit values, wherein the second bit position is determined based on the adjusted first bit position.

11. The device of claim 10, wherein the sampling blocks comprise:
a first double data rate (DDR) block adapted to sample a first copy of the serial data signal to provide a first subset of the samples; and
a second DDR block adapted to sample a second copy of the serial data signal to provide a second subset of the samples, wherein the samples are distributed over the bit periods of the serial data signal at approximately 90 degree intervals.

12. The device of claim 11, the device further comprising sample reordering logic adapted to sequentially order the samples provided by the sampling block.

13. The device of claim 10, wherein the sample error filter comprises logic adapted to apply a plurality of masks to the samples to detect errors in the samples and correct a detected error in a sample by inverting the bit value of the sample.

14. The device of claim 10, wherein the sample error filter comprises:
a first register adapted to receive the samples from the sampling block;
logic adapted to apply a plurality of masks to the samples in the first register to detect errors in associated subsets of the samples in the first register and correct a detected error in a sample by inverting the bit value of the sample;
a second register adapted to receive the samples from the first register; and
logic adapted to apply the masks to the samples in the second register to detect additional errors in different associated subsets of the samples in the second register and correct an additional detected error in a sample by inverting the bit value of the sample.

15. The device of claim 10, wherein the data extraction block comprises logic adapted to apply a plurality of masks to the samples to identify the data bit values.

16. The device of claim 10, wherein the device is a programmable logic device (PLD).

* * * * *